United States Patent [19]

Moltrasio

[11] Patent Number: 5,075,366

[45] Date of Patent: Dec. 24, 1991

[54] MULTI-PURPOSE MASTERBATCHES

[76] Inventor: Giuseppe Moltrasio, Via Roma, 67, 21047 Saronno (Prov. of Varese), Italy

[21] Appl. No.: 603,417

[22] Filed: Oct. 26, 1990

[51] Int. Cl.$^5$ .................................................. C08K 5/11
[52] U.S. Cl. .................................... 524/306; 524/308; 524/310; 524/311; 524/314; 524/317
[58] Field of Search ............... 524/306, 308, 310, 311, 524/314, 317

[56] References Cited

U.S. PATENT DOCUMENTS 4,839,414  6/1989  Bederke et al. ..................... 524/507

Primary Examiner—Paul R. Michl
Assistant Examiner—Peter Szekely
Attorney, Agent, or Firm—Birch, Stewart, Kolasch & Birch

[57] ABSTRACT

Masterbatches which can be employed for dyeing and compounding various materials, such as polymer-based paints, plastic materials and inks, consists of homogeneous mixtures of acrylic resins and/or ketone or aldehyde-resins, esters of citric, acetylcitric or tartaric acid, and dyes, pigments and/or additives.

19 Claims, No Drawings

MULTI-PURPOSE MASTERBATCHES

BACKGROUND OF THE INVENTION

In the fields of plastic materials, paints, printing inks, etc., specific masterbatches or pastes (also called mother mixes) are commercially employed to obtain colored materials. These pastes or masterbatches are normally admixtures of high concentrations of pigments, dyeing materials and other additives as needed.

These masterbatches or pastes are then dispersed in plastic materials, paints, and inks of various types, in order to achieve desired concentrations of dyeing materials and additives.

In the prior art, no single masterbatch exists which may be employed for dyeing all the categories of materials mentioned.

It is desirable, however, to have a masterbatch which can be employed for many materials, so that a certain pigment, dye or additive once dispersed in such a mother mix may serve for dyeing many different materials or as an additive to many different materials.

Such a single masterbatch would be particularly desirable in the paint industry, where one producer prepares various paints based on various polymer bases, such as nitrocellulose, alkyd, vinyl, acrylic, epoxy, polyester, polyurethane etc. The producer presently has to prepare, for a certain dye, pigment or additive, a multitude of pastes as necessary for the various paints of different polymer bases produced.

Furthermore, at the point of sale, it is necessary to have a large assortment of products with various polymer bases and of various colors in order to satisfy needs of the final users.

The producer must, therefore, have at his disposal a vast number of masterbatches for each color nuance and for each polymer base, so as to prepare the various paints as needed.

This entails a considerable delay in answering market requests. In order to obviate this delay, it has been necessary to have at the point of sale a vast stock of ready colored paints for each color in each polymer base.

This storage requirement entails a large capital outlay and may create serious environmental problems, as paints undergo alterations with time and if not used must be discarded.

SUMMARY OF THE INVENTION

The present invention relates to multi-purpose masterbatches suitable for dyeing or serving as additives to different materials, such as paints of various polymer bases, plastic materials and inks. The invention consists essentially of a homogeneous mixture of three components: a) acrylic and/or ketone and/or aldehyde resins; b) citric, acetylcitric or tartaric acid esters; and c) dyes and/or pigments and/or additives.

DETAILED DESCRIPTION OF THE INVENTION

It is an object of the present invention to provide a multi-purpose masterbatch which may be employed to disperse dyes, pigments and additives in paints with various polymer bases, in various plastic materials, in printing inks and serigraphy, etc. Therefore, a single masterbatch, which contains a specific dye in dispersion may be employed to dye paints of various polymer bases, or to dye resins such as polyethylene, ABS, PVC, or rubbers, inks, etc.

The masterbatches which are the subject of the present invention comprise three essential components:

a) a first component consisting of a resin selected from the group comprising:
- $a_1$) acrylic resins which may be admixed with versatic resins having a softening point of between 75° and 115° C.; and
- $a_2$) ketone or aldehyde resins, preferably cyclohexanone or urea-aldehyde resins, having a softening point of between 70° and 115° C.;

b) a second component selected from the group consisting of:
- $b_1$) citric, acetylcitric or tartaric acid esters of glycols or polyalkyleneglycols containing between 10 and 30 monomeric units; and
- $b_2$) citric or tartaric acid mono-alcohol esters in admixture with polyalkyleneglycols containing between 10 and 30 monomeric units, and which may be esterified with fatty acids having between 4 and 18 carbon atoms; and c) dyes and/or pigments and additives.

Resin a) should have a melting point sufficiently low so as to allow extrusion of the a+b mix at a temperature not higher than 150° C., in order not to damage the pigments and additives dispersed in the masterbatch. Furthermore, resin a) should be soluble in the organic solvents employed as paint vehicles In place of resin $a_1$ alone or resin $a_2$ alone, one may employ mixtures of both in a ratio of $a_1/a_2$ in the range of 70:30 to 10:90. The weight ratio between resin a) and component b) should be between 95:5 and 80:20.

The masterbatches according to the invention are prepared in general by dispersing in component b) the normal additives, such as antiflocculant, antisediment, flameproofing, and antistatic agents, while in resin a) the dye and/or pigment is admixed.

The two mixes are then put together, preferably following the following steps: Resin a) and the desired pigment or dye are charged in a turbo-dispersing apparatus, or in a similar apparatus suitable for obtaining a thorough mixing, and the batch is kept under stirring until an intimate dispersion is obtained. A dispersion of the possible additives in component b) is prepared separately and this dispersion is slowly added to the pigment or dye dispersion in resin a), while the dispersing apparatus is kept turning. In the absence of additives, only component b) is added in the same way. A powder is thus obtained, which is put into a bifilar extruder and extruded at a temperature of between 90° and 150° C. At the exit of the extruder a cutter is provided which cuts the extruded mix into pellets of desired sizes.

The pellets are then stocked as such or ground to obtain granules or powders. The thus obtained masterbatches may be added to materials to be dyed or to materials to which additives must be added, so that a certain dye, pigment and/or additive may be admixed in any type of finished product, such as paints, resins, inks, etc. Any type of pigment, dye or additive stable up to 150° C. may be comprised in the a)+b) mixture to form the masterbatch. The pigment and/or dye percentage in the masterbatch may vary according to the nature of the substance: with carbon black the percentage is preferably not higher than 16%, while in the case of titanium dioxide the percentage can reach 90%.

The masterbatches according to the invention may be admixed with nitrocellulose, alkyd, acrylic, vinyl, epoxy, polyurethane, polyester and chlorinated-rubber paints, in which they are dispersed by simple stirring, without any need of more complex operations, such as milling, kinetic dispersion, raffination, filtration etc. This simple stirring provides advantages both in cost and for the environment.

The same masterbatches may be dispersed in vinyl polymers, polyethylene, ABS resins, polyamide resins and elastomers.

The masterbatches according to the invention considerably simplify the paint sales system. In fact, as a masterbatch is easily dispersed in the polymer base by mere stirring, the preparation of paints of any type or color need not be done at the plant, but may be done by the distributor, who requires only a series of masterbatches of different colors and of colorless polymer bases. By dissolving a certain masterbatch in any polymer base, the distributor may thus immediately obtain the paint of the color requested by the client.

The following examples are reported to better illustrate the invention without any limitation thereof.

EXAMPLE 1

In a turbo-dispersing apparatus, 100 g of component a) are charged having the following composition by weight: PARALOID DM-55 (Rohm & Haas Co.) (a solid acrylic resin soluble in organic solvents with a flow point of 70° C.) 45%; LAROPAL K 80 (BASF) (a cyclohexanone condensation product, with a softening point of between 75° and 85° C.) 55%. 80 g of phthalocyanine blue pigment are then added and the mixture is stirred thoroughly until a uniform dispersion is obtained. While the apparatus is kept under stirring, 20 g of component b) having the following composition by weight are added:

| tributylcitrate | 70% |
| PEG 400 ML | 10% |
| TBCP | 4% |
| Elfugine V | 3% |
| triethanolamine | 12% |
| TO additive | 1% |

PEG 400 ML (COMIEL S.p.A.) is a non-ionic liquid tensioactive product obtained by esterification of a medium-short chain polyethyleneglycol. TBCP is 2-Cl-ethanol phosphate, normally employed as a fireproofing agent.

Elfugine V (Sandoz) is an amphoteric liquid, normally employed as an antistatic agent.

TO additive (Bayer) is a silicone liquid normally employed to improve the spreading of paints and to impart efficient anti-scratch properties.

After the addition of component b) the apparatus is kept turning for an additional 10 minutes, thus obtaining a powder which is then fed to a bifilar extruder, at a temperature of 120° C. The extruded product is then cut into pellets.

In the obtained masterbatch, phthalocyanine blue is thus present in an amount of 40% by weight.

The masterbatch pellets thus obtained were employed to impart a blue color to SIPE NOBEL nitrocellulose paints both of high and low viscosity (type NORMA 37, 32, 27, 24, 9 and 7), thereby obtaining a perfect color distribution.

The same masterbatch was employed to color printing and offset inks as well as PVC polymers, demonstrating the perfect compatibility of a single masterbatch with paints, inks and plastic materials.

EXAMPLE 2

In the mixing apparatus of Example 1, and in the same way, 40 g of component a) are charged having the following composition by wt: PARALOID DM-55 30%; LAROPAL A 81 (BASF) (a urea-aliphatic aldehyde condensation product, with a softening point of 80°-90° C.), 70%. 150 g of a red iron oxide 130M pigment are then added and the mixture is stirred until a complete dispersion is obtained. 10 g of component b) are then added slowly, having the same composition as in Example 1. The obtained powder is extruded at 120° C. and the extruded product is cut into pellets. These are then micronized to a 20 to 50 micron powder.

The pulverized masterbatch (final product) contains therefore 75% pigment by wt.

The thus obtained masterbatch was employed to color alkyd, epoxy, vinyl, acrylic, polyurethane and polyester resins to a perfect homogeneous color.

This masterbatch was also employed to color plastic materials consisting essentially of PVC, polyethylene, polypropylene and polyamides to a perfectly homogeneous color.

EXAMPLE 3

In the turbo-dispersing apparatus of Example 100 g of component a) are charged, having the following composition: PARALOID DM 55 15%, and a mixture in equal parts of LAROPAL K 80 and LAROPAL A 81, 85%. 80 g of phthalocyanine blue pigment are then added and the mixture is stirred until an intimate dispersion is obtained. 20 g of component b) having the same composition as in Example 1 are then added slowly under continued stirring. The obtained powder is then extruded at 120° C. and the extruded product is cut into pellets.

The color is thus contained in the masterbatch in an amount of 40% by wt.

The thus obtained masterbatch was employed to color in blue, with perfect color homogeneity, nitrocellulose, alkyd, acrylic, vinyl epoxy, polyurethane and polyester resin, also polyethylene, ABS resin and natural rubber.

EXAMPLE 4

Employing the apparatus of Example 1 and in the same way, 40 g of Component a) are charged, consisting of LAROPAL A 81. 150 g of red iron oxide 130M pigment are added and the mixture is stirred to obtain a complete dispersion. In the turbo-dispersing apparatus 10 g of component b) are then added slowly, having the following composition by wt.:

| acetyltributylcitrate | 45% |
| PEG 400 ML | 20% |
| epoxydized soy oil | 15% |
| dioctylphthalate | 20% |

The obtained powder is extruded at 120° C. and the extruded product is cut into pellets. These pellets are then ground, to obtain a powder of between 20 and 50 micron size.

The pigment is thus contained in the masterbatch in an amount of 75% by wt.

The thus obtained masterbatch was employed to color alkyd, epoxy, vinyl, acrylic, polyurethane, and polyester based paints with perfect color homogeneity. It was also employed to color with perfect homogeneity plastic materials consisting essentially of polyethylene and polypropylene.

EXAMPLE 5

In the same apparatus of Example 1 and operating in the same way, 100 g of component a), having the following composition: PARALOID DM 55 20%, mixture in equal parts of LAROPAL K 80 and LAROPAL A.81, 80% are charged. 80 g of a lead chromate pigment are then added, while stirring to obtain an intimate dispersion. While stirring continuously, 20 g of component b) are added slowly having the following composition:

| | |
|---|---|
| acetyltributylcitrate | 62% |
| PEG 400 ML | 30% |
| TBCP | 4% |
| Elfugine V | 3% |
| TO additive | 1% |

The obtained powder is then extruded at 115° C. and the extruded product is cut into pellets.

The coloring matter is thus present in the masterbatch in an amount of 40% by wt.

The thus obtained masterbatch was employed to color with perfect homogeneity paints based on nitrocellulose, alkyd, acrylic, vinyl, epoxy, polyurethane and polyester resins; also polyethylene, ABS resins and natural rubber.

EXAMPLE 6

Employing the apparatus of Example 1 and operating in the same way, 50 g of component a) consisting of PARALOID Dm 55 were charged, then 150 g of manganese CM lacquer pigment (Bayer), colored in red were added, and the mixture was stirred to obtain an intimate dispersion. Into the turbo-dispersing apparatus 15 g of component b) were then added slowly, having the same composition as in Example 1. The obtained powder was extruded at 140° C. and the extruded product cut into pellets. In the pulverized masterbatch (final product) 67% by wt. of pigment was contained.

The thus obtained masterbatch was employed to color nitrocellulose, alkyd, epoxy, vinyl, acrylic, polyurethane, and polyester paints with a perfect color homogeneity. It was also employed to color in a perfectly homogeneous way plastic materials consisting essentially of polyamide, polyethylene and polypropylene resins.

I claim:

1. A multi-purpose masterbatch, consisting essentially of a uniform mixture of the following components:
   a) a resin selected from the group of:
      a₁) acrylic resins, possibly in admixture with versatic resins, having a softening point of between 75° and 115° C.
      a₂) ketone or aldehyde resins having softening points of between 70° and 115° C.; or an admixture of a₁ and a₂ in a ratio in the range of 70:30 to 10:90
   b) a second component selected from the group of
      b₁) citric, acetylcitric or tartaric acid glycol polyalkyleneglycol esters containing between 10 to 30 monomeric units
      b₂) citric, acetylcitric or tartaric acid monoalcohol esters, in admixture with polyalkyleneglycols containing between 10 and 30 monomeric units, and which may be esterified with fatty acids of 4 to 18 carbon atoms; and
   c) dyes and/or pigments and/or additives.

2. The masterbatch according to claim 1, wherein said resin a) is soluble in organic solvents employed as vehicles for paints.

3. The masterbatch according to claim 2, wherein said resin a) consists of acrylic resins.

4. The masterbatch according to claim 2, wherein said resin a) consists of ketone resins.

5. The masterbatch according to claim 2, wherein said resin a) consists of aldehyde resins.

6. The masterbatch according to claim 2, wherein said resin a) consists of an admixture of ketone resin and acrylic resin.

7. The masterbatch according to claim 2, wherein said resin a) consists of an admixture of acrylic and aldehyde resins.

8. The masterbatch according to claim 2, wherein said resin a) consists of an admixture of ketone and aldehyde resins.

9. The masterbatch according to claim 2, wherein said resin a) consists of an admixture of acrylic, ketone and aldehyde resins.

10. The masterbatch according to any one of claims 4, 6, 8 and 9, wherein said ketone resins are cyclohexanone condensation products.

11. The masterbatch according to any one of claims 5, 7, 8 and 9 wherein said aldehyde resin is a condensation product of aldehydes and urea.

12. The masterbatch according to claim 1, wherein said component b) consists of an admixture of tributylcitrate and fatty acid polyalchyleneglycol esters.

13. The masterbatch according to claim 1, wherein said component b) consists of an admixture of acetyltributylcitrate and fatty acid polyalchyleneglycol esters.

14. The masterbatch according to claim 1, wherein a weight ratio of said resin a) to said component b) is in a range of 90:10 to 80:20.

15. The masterbatch according to claim 1, wherein a percentage of said dyes or pigments is in a range of 16 to 90%.

16. Use of the masterbatch according to claim 1 for uniformly coloring nitrocellulose, alkyd, acrylic, vinyl, epoxy, polyurethane, polyester or chlorinated rubber based paints.

17. Use of the masterbatch according to claim 1 for uniformly coloring vinyl, polyethylene, polypropylene, ABS, and polyamide resins and rubber.

18. A process for the preparation of the masterbatch according to claim 1, comprising the following successive steps:
   intimate admixture of said resin a) with said dye or pigment in a mixing apparatus;
   gradual addition of said component b), which may contain dispersed one or more additives, to said admixture of a) with said dye or pigment; resulting in a mass;
   further mixing of said mass to obtain a homogeneous powder; and
   extrusion of said mass at a temperature not higher than 150° C.

19. The process according to claim 18, wherein said mixing apparatus is a turbo-dispersing mixer.

* * * * *